UNITED STATES PATENT OFFICE.

WILLIAM STANLEY COOKSON, OF TAIPING, PERAK, STRAITS SETTLEMENTS, ASSIGNOR TO LULU MITCHELL SMITH, OF MAUNAWAI, HONOLULU, HAWAIIAN ISLANDS.

COCOANUT FOOD PRODUCT.

1,374,880.     Specification of Letters Patent.     Patented Apr. 12, 1921.

No Drawing.     Application filed February 25, 1919. Serial No. 279,168.

*To all whom it may concern:*

Be it known that I, WILLIAM STANLEY COOKSON, a subject of the King of Great Britain, a citizen of Straits Settlements, residing at Taiping, in the State of Perak, Straits Settlements, have invented certain new and useful Improvements in Cocoanut Food Products, of which the following is a specification.

My invention relates to improvements in food products which I designate nut bran, and it consists in the novel product and also in the process of making the same.

An object of my invention is to provide a cocoanut product which contains a relatively small amount of pure neutral oil or fat, and which therefore is easily digested as compared with desiccated cocoanut containing a relatively greater amount of fat.

A further object of my invention is to provide a food product made from the cocoanut which is rendered tender, and therefore more easily digested, by the weakening of the cell walls of the tissue of the endosperm or the "white meat" of the cocoanut, by roasting the same until the product is crisp and dry.

A further object of my invention is to provide a food product which is tender and digestible as well as one of the most nutritious and well balanced of all foods.

A further object of my invention is to provide a food product which possesses, without the sacrifice of any of its nutritive or digestive qualities, a structure and texture which confer on it naturally the physiological qualities gained for most cereal foods by the admixture of bran.

A further object of my invention is to provide a process by means of which the nut bran is produced.

Other objects and advantages will appear in the following specification, and the novel features of the invention will be particularly pointed out in the appended claims.

In carrying out my invention I make use of fresh cocoanut or clean copra as raw material. If fresh cocoanuts are taken, it is preferable, although not essential to have them of a certain degree of ripeness, *i. e.*, a stage before the oil content of the cocoanut has reached its maximum, and before the sugar content has reached its minimum. This stage is reached at about the time when the watery contents of the ripening cocoanut have been sufficiently reduced in volume to be barely perceptible on shaking. At a later stage the watery contents will shake audibly.

If the fresh cocoanuts are taken as raw material, the husk of the cocoanut (epicarp and mesocarp) may be removed or not, as desired. The cocoanut is opened by splitting, sawing, breaking, or by any other suitable means, and the pericarp is removed. The endosperm (albumin or "white meat") is removed by rasping, scraping, grinding, cutting, breaking, or in any other suitable manner.

Where copra is used as raw material, the process begins with the following steps. The endosperm from the copra, or from the fresh cocoanut as above described, is reduced to a more or less finely divided state either in the presence of water, such as the water of the cocoanut, or other water, or else a quantity of water or some similar liquid is added after the endosperm has been reduced to a satisfactory state of division, that is to say, to pieces ranging in weight from one gram downward, and of any shape. The quantity of water added will run from an amount equal to one-quarter by weight of the endosperm used, up to any convenient amount, usually not exceeding one-half the weight of the endosperm used.

The endosperm, with its added liquid, is squeezed or subjected to pressure, either by hand or in any kind of press, moisture expeller, or in any other mechanical contrivance, or by rolling, or by a combination of rolling and abrasion, or by any kind of screw action, or by action similar to that of a mortar and pestle, with the object of separating from the solid constituents of the endosperm the liquids originally contained therein, in the form of emulsions or otherwise, in addition to the liquid added to the endosperm. Instead of using mechanical means for extracting the liquid portions of the endosperm from the solid portion, they may be extracted with carbon tetrachlorid, petroleum, ether, chloroform, or any other fat solvent.

The steps thus far described will result in two products,—one comprising the solid constituents of the endosperm, plus such of the liquids as may resist separation therefrom, and the other the residual liquid.

The present application deals primarily with the former, i. e., the solid constituents. The result of the treatment described above is the production of a grated cocoanut endosperm from which a portion of the normal amount of oil contained therein has been removed. It is a grated (fined) cocoanut endosperm with a reduced oil content, and in this it differs from the ordinary desiccated cocoanut. Some or all of the sugars and albuminoids may also be removed along with the removal of the portion of oil. The removal or otherwise of these sugars and albuminoids is not an essential part of the process.

The grated cocoanut endosperm obtained as described above, is roasted, with or without the addition of cane, grape or milk sugar, glucose, cane syrup, or any other form of sugar, until the product is crisp and dry, and more or less browned, the color of the final product varying with the extent of the roasting and the amount and character of the sugar used. The tenderness and weakening of the cell walls of the endosperm is accomplished by the water treatment, or soaking, mentioned above, followed by the roasting.

A product produced as described contains, as stated, only from 15% to 25% of pure neutral oil or fat, whereas desiccated cocoanut, which is tough and indigestible, contains from 65% to 70% of fat, which is far too large a proportion for human food. Superficially, the nut bran appears to have some resemblance to the desiccated cocoanut, but as an article of food the product is infinitely superior for the reasons stated. The small amount of oil or fat renders the product perfectly assimilable, while the process described above renders the cell walls of the tissue of the endosperm weak and tender.

I claim:

1. The herein described roasted food product which consists of comminuted cocoanut endosperm containing from 15% to 25% of pure neutral oil or fat substantially free from rancidity, the cell walls of the tissue of the endosperm being weak and tender.

2. The herein described food product which is more or less browned, coarsely granular, crisp, dry and only slightly hygroscopic and which consists of comminuted cocoanut endosperm containing from 15% to 25% of pure neutral oil or fat free from rancidity.

3. The herein described food product which is coarsely granular, crisp, dry and only slightly hygroscopic and which consists of comminuted cocoanut endosperm containing from 15% to 25% of pure neutral oil or fat free from rancidity.

WILLIAM STANLEY COOKSON.